United States Patent [19]

Alexander et al.

[11] Patent Number: 4,825,327
[45] Date of Patent: Apr. 25, 1989

[54] NEGATIVE AND ZERO SEQUENCE DIRECTIONAL OVERCURRENT UNIT FOR AC POWER TRANSMISSION LINE PROTECTION

[75] Inventors: George E. Alexander, Wallingford; Stanley B. Wilkinson, Havertown, both of Pa.

[73] Assignee: General Electric Company, King of Prussia, Pa.

[21] Appl. No.: 120,078

[22] Filed: Nov. 12, 1987

[51] Int. Cl.[4] .............................................. H02H 3/28
[52] U.S. Cl. ....................................... 361/82; 361/65; 361/76; 361/87
[58] Field of Search ...................... 361/62, 63, 64, 65, 361/66, 76, 77, 78, 79, 80, 82, 83, 84, 85, 86, 87

[56] References Cited

U.S. PATENT DOCUMENTS

| | | | |
|---|---|---|---|
| 1,920,329 | 8/1933 | Tippett | 361/79 |
| 4,347,542 | 8/1982 | Calhoun | 361/76 |
| 4,357,644 | 11/1982 | Schmidt | 361/76 |
| 4,405,966 | 9/1983 | Cavero | 361/80 |
| 4,453,191 | 6/1984 | Wilkinson | 361/84 |
| 4,686,601 | 8/1987 | Alexander et al. | 361/80 |

Primary Examiner—A. D. Pellinen
Assistant Examiner—H. L. Williams
Attorney, Agent, or Firm—Henry J. Policinski; William H. Murray

[57] ABSTRACT

A protective relay for detecting faults within a predetermined protected zone of a three phase alternating current electrical power distribution system, of the type which utilizes at least one restraint signal in conjunction with at least one operate signal to generate a net operate signal, generates an operate quantity which is related to a zero sequence component of current flowing in the power distribution system and a second operate quantity which is related to a negative sequence component of the current flowing in the power distribution system. The operate quantities are summed to form an operate signal. An adaptive restraint, which is proportional to a negative sequence component and a zero sequence component of a phase voltage of the power distribution system, is generated and utilized to provide increased sensitivity to higher resistance ground faults. A portion of a positive sequence component of the current flowing in the power distribution signal is utilized as a restraint signal to prevent the unit from operating on negative sequence currents present during normal load conditions. Adaptive restraint enables the directional overcurrent unit to operate correctly should a second fault occur on the transmission line during the period that one pole is open.

10 Claims, 4 Drawing Sheets

NEGATIVE AND ZERO SEQUENCE DIRECTIONAL OVERCURRENT UNIT FOR AC POWER TRANSMISSION LINE PROTECTION

BACKGROUND OF THE INVENTION

The present invention relates to protective relay circuits for use in AC power distribution systems and more particularly to directional overcurrent relays used for transmission line protection.

Directional overcurrent relays are used in AC power transmission line protection systems to determine whether a fault is in the direction of the protected zone or in the "reverse" or non-protected direction. Negative sequence directional overcurrent relays are particularly useful in directional comparison relay schemes because they are essentially unaffected by such things as zero sequence mutual coupling.

Prior art negative sequence overcurrent trip units were primarily responsive to the level of negative sequence current; but had a restraint proportional to the positive sequence current; for example, $I_2 - KI_1$. Although such units perform satisfactorily, there was a probability of false tripping because of the reliance upon the level of negative sequence current by the unit even with the addition of the restraint proportional to the positive sequence current. In addition, prior art units operated relatively quickly on remote external faults thereby increasing the probability that the unit would operate before the external fault was cleared. Furthermore, prior art overcurrent trip units require settings which must be increased by the maximum negative sequence shunt charging current (due to the shunt capacitance on the line), based on maximum negative sequence voltage, $V_2$ on the line. This was required to prevent a misoperation with a tripping scheme and to assure coordination with the remote overcurrent blocking unit in a blocking scheme. However, due to a high resistance ground fault, $V_2$ will be substantially less than its worse case maximum value. With this approach, a higher setting on $I_2 - KI_1$ due to the fact that the worse case must be considered, limits the sensitivity of the prior art units to ground fault resistance.

Accordingly, it is an object of the present invention to provide a directional overcurrent relay for protection of an AC power transmission line, the operation of which enhances the security of the protective relaying system.

It is another object of the present invention to provide a directional overcurrent unit utilizing improved operating quantities which cause the unit to operate for fewer external faults than prior art units.

It is a further object of the present invention to provide a directional overcurrent unit that will operate correctly should a second fault occur on the transmission line during the period that one pole is open.

It is yet another object of the present invention to provide a directional overcurrent unit for use for protection of an AC power transmission line which has comparatively longer operating times on remote external faults than do prior art units thereby increasing the probability that the external fault will be clear before the unit can operate, thus diminishing the possibility of a misoperation where a false channel operation might occur during the fault.

It is a still further object of the present invention to provide a directional overcurrent unit which has increased sensitivity to high resistance ground faults.

These and other objects of the present invention will become apparent to those skilled in the art upon consideration of the following description of the invention.

SUMMARY OF THE INVENTION

The present invention comprises a directional overcurrent relay which includes an energy comparator comprising an integrator circuit and a level detector circuit. The output of the integrator circuit varies as a function of the magnitude of the difference between operate and restraint signals, which provides an operating time based upon fault severity. The output of the integrator circuit is coupled to the input of the level detector circuit which generates an output signal when the input magnitude exceeds a predetermined trip level. This results in comparatively longer operating times on remote external faults.

The directional overcurrent unit of the present invention utilizes a zero sequence operating quantity which is added to the negative sequence operating quantity therefore causing the negative sequence component of the current to have less of an effect. Advantage is taken of the fact that the zero sequence current is typically much smaller than the positive and negative sequence for external faults.

An adaptive restraint, which is proportional to the negative and zero sequence voltages, is utilized in the directional overcurrent unit of the present invention to provide increased sensitivity to higher resistance ground faults. As the negative (and zero) sequence voltage component increases, the restraint correspondingly increases; whereas, for little or no negative (or zero) sequence voltage component, the unit of the present invention is close to or at its most sensitive pick-up value. This adaptive restraint for the shunt charging current results in the unit having a greater sensitivity to high resistance ground faults as compared to prior art schemes wherein the overcurrent trip unit setting must be increased by the maximum negative sequence shunt current based on the maximum negative sequence voltage on the line.

In the overcurrent blocking function, the directional overcurrent unit of the present invention utilizes a portion of the positive sequence current as a restraint signal. This positive sequence current restraint prevents the unit from operating on negative sequence currents present during normal load conditions and relieves the user from determining a setting.

The features of the present invention believed to be novel are set forth particularly in the appended claims. The invention itself, however, both as to its organization and operation, together with further objects and advantages thereof, may best be understood by reference to the following description in conjunction with the accompanying drawing figures.

DETAILED DESCRIPTION OF THE PREFERRED EMBODIMENT

Figure 1:
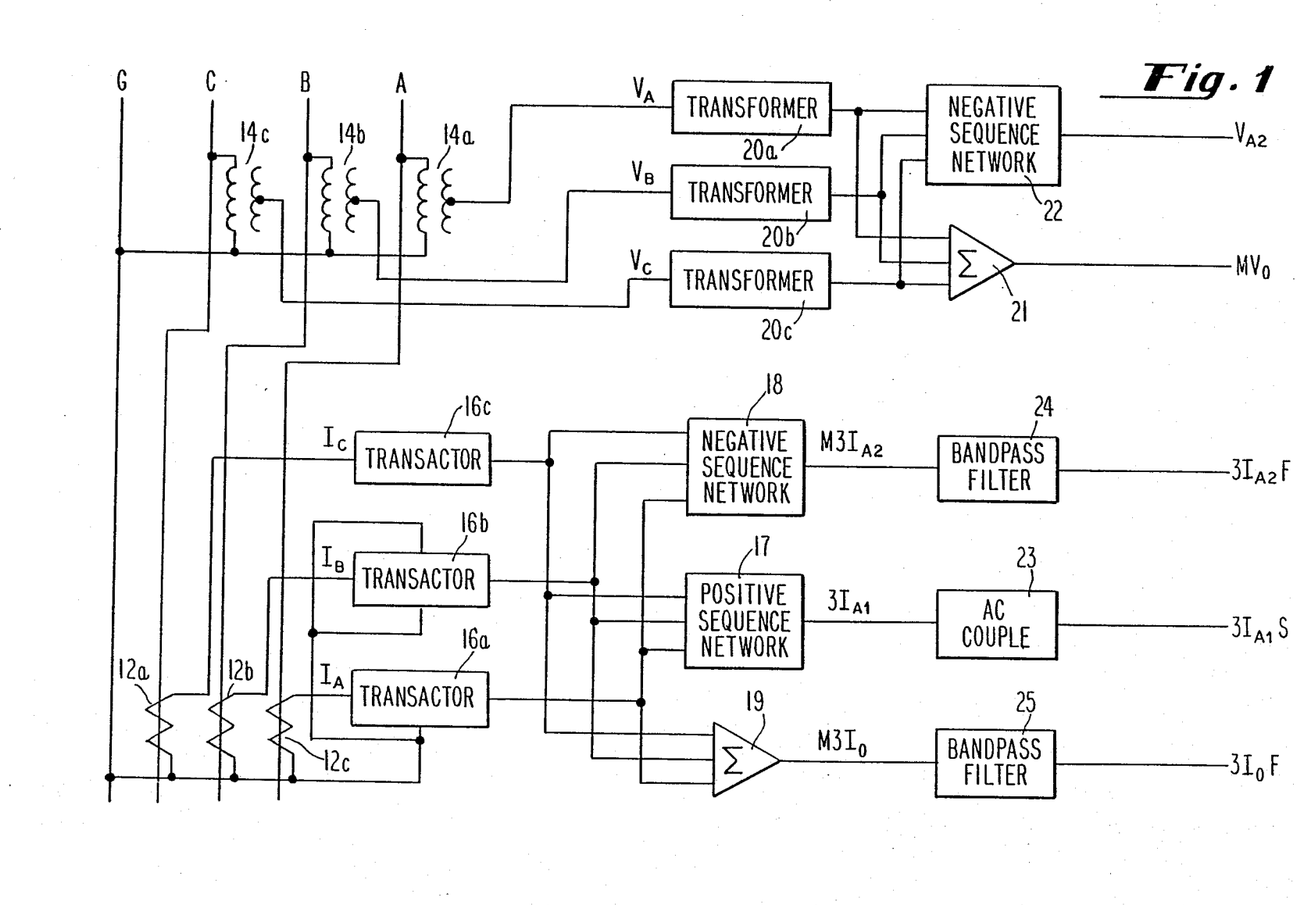
FIG. 1 is a one line, block diagram of a current and voltage processing portion of a preferred embodiment of the present invention.

Referring to FIG. 1, there is shown a three-phase alternating current electric power transmission line, generally designated 10, having an A phase (A), a B phase (B), a C phase (C), and ground (G). Each of the three phases have associated with it means 12 for sensing the current in that particular phase as well means 14 for sensing voltage on that phase. As is well known to those skilled in the protective relaying and power transmission art, current sensing means 12 may be a current transformer and voltage sensing means 14 may be a step down potential transformer. As shown in FIG. 1, a current sensing means is associated with each phase; means 12a being associated with phase A, means 12b being associated with phase B and means 12c being associated with C. Likewise, there is a separate voltage sensing means 14a associated with phase A, means 14b associated with phase B and means 14c associated with phase C. However, it is to be understood that although a specific type of current and voltage sensing scheme is depicted in FIG. 1, other schemes known in the art may be substituted for that depicted: the purpose being to obtain signals which are related to each phase voltage and each phase current.

The output from the current sensing means 12a is coupled to a first transactor 16a; the output from current sensing means 12b is coupled to a second transactor 16b; and the output from the current sensing means 12c is coupled to a third transactor 16c. As is known in the art, the secondary voltage output of a transactor is related to the input current by a complex proportionality constant or vector operator known as the transfer impedance of the transactor. For transactors 16a, 16b and 16c shown in FIG. 1, the transfer impedance of each is selected to be equal to a fixed transfer ratio and a fixed angle, for example 85°. Consequently, the output of transactor 16a is a signal $I_{AT}$ which has, for example a fixed 85° phase shift with respect to the input $I_A$. The output signals $I_{BT}$ and $I_{CT}$ from the transactors 16b and 16c respectively, are similarly related to their respective inputs $I_B$ and $I_C$. Further detailed description of transactors may be had by reference to U.S. Pat. No. 3,374,399, issued to Dewey which patent is assigned to the assignee of the present invention and the teachings of which are incorporated by reference in this detailed description as if fully set forth therein.

The outputs of the transactors 16a, 16b and 16c are coupled to the inputs of a positive sequence network 17, a first negative sequence network 18 and a first three-input summing amplifier 19. The output of voltage sensing means 14a is coupled to the primary of a first transformer 20a; the output of the voltage sensing means 14b is coupled to the primary of a second transformer 20b; and the output of the voltage sensing means 14c is coupled to the primary of a third transformer 20c. The signals from the secondaries of transformers 20a, 20b and 20c are coupled to the inputs of a second three-input summing amplifier 21 and a second negative sequence network 22.

It is well understood by those skilled in the art of electrical power transmission relaying that phase currents in a three-phase alternating current circuit can be resolved into three sets of symmetrical balanced voltage and current vectors known as positive sequence, negative sequence and zero sequence components. It is also well known that certain circuits called "symmetrical component networks" can be connected to a three-phase electrical power system to provide an output signal that is proportional to the magnitude of the selected one of the three sequence components of voltage or current. The positive sequence network 17 and first 18 and second 22 negative sequence networks are such networks. The positive sequence network 17 has a gain substantially equal to 3 at an angle of 25°. Consequently, the output of the positive sequence network 17 is the signal $3I_{A1}$ which, in the nomenclature used herein, signifies a quantity having three times the magnitude of the positive sequence component $I_{A1}$ referenced to the current flowing in the A phase of the transmission line.

The first negative sequence network 18 has a gain which is substantially equal to $-3$ at a angle of 25°. Consequently, the output of the first negative sequence network 18 is the signal $M3I_{A2}$ where, in the convention used herein, M signifies that the quantity which follows is the inverse of the quantity without the M proceeding it; and the quantity $3I_{A2}$ signifies a quantity having three times the magnitude of the negative sequence component $I_{A2}$ referenced to the current flowing in the A phase of the transmission line. The second negative sequence network 22 has a gain which is substantially equal to 1 at an angle of 25°. Consequently, the output of the second negative sequence network 22 is the negative sequence component $V_{A2}$ of the voltage on the A phase of the transmission line. Further detailed descriptions of symmetrical component networks can be had with reference to U.S. Pat. Nos. 3,992,651 issued to Hodges; and 4,034,269 issued to Wilkinson, both of which patents as well as U.S. Pat. No. 4,342,062, are assigned to the assignee herein and the teachings of all are incorporated into this detailed description by reference as if fully set forth herein.

The output $3I_{A1}$ from the positive sequence network 17 is coupled to the input of a first AC couple circuit 23. In the preferred embodiment, the first AC couple circuit 23 comprises a non-inverting operational amplifier which has a gain of one for input signals at the nominal power system frequency, typically 60 Hz or 50 Hz, but a gain substantially equal to zero for any DC component in the input signal. The output of the first AC couple circuit 23 is the signal $3I_{A1}S$ wherein the S signifies, in the convention used herein, that the signal is the output of an AC couple circuit. The output $M3I_{A2}$ from the first negative sequence network 18 is coupled to the input of a first band pass filter 24. In the preferred embodiment, the first band pass filter 24 has a center frequency equal to the nominal power system frequency, typically 50 Hz or 60 Hz, a gain of $-1$ and a Q of approximately 2. The output of the first band pass filter 24 is the signal $3I_{A2}F$ wherein the F signifies, in the convention used herein, that the signal has been filtered.

In the preferred embodiment, the first three-input summing amplifier 19 is a summing amplifier which has a gain substantially equal to $-1$ at an angle of 25°. The output $M3I_0$ of the first three-input summing amplifier 19 is a signal which is equal to the negative of the vector sum of the input signals. The output of the first three-input summing amplifier 19 is coupled to the input of a second band pass filter 25. In the preferred embodiment, the second band pass filter 25 has a center frequency equal to the nominal power system frequency, typically 50 Hz or 60 Hz, a gain of −1 and a Q of approximately 2. The output of the second band pass filter 25 is the signal $3I_0F$. In the preferred embodiment, the second three-input summing amplifier is the same type as the previously described first three-input summing amplifier having a gain substantially equal to $-\frac{1}{3}$ at an angle of 25°. The output $MV_0$ of the second three-input summing amplifier 21 is the inverse of the zero sequence component of the voltage on the transmission line.

Figure 2:
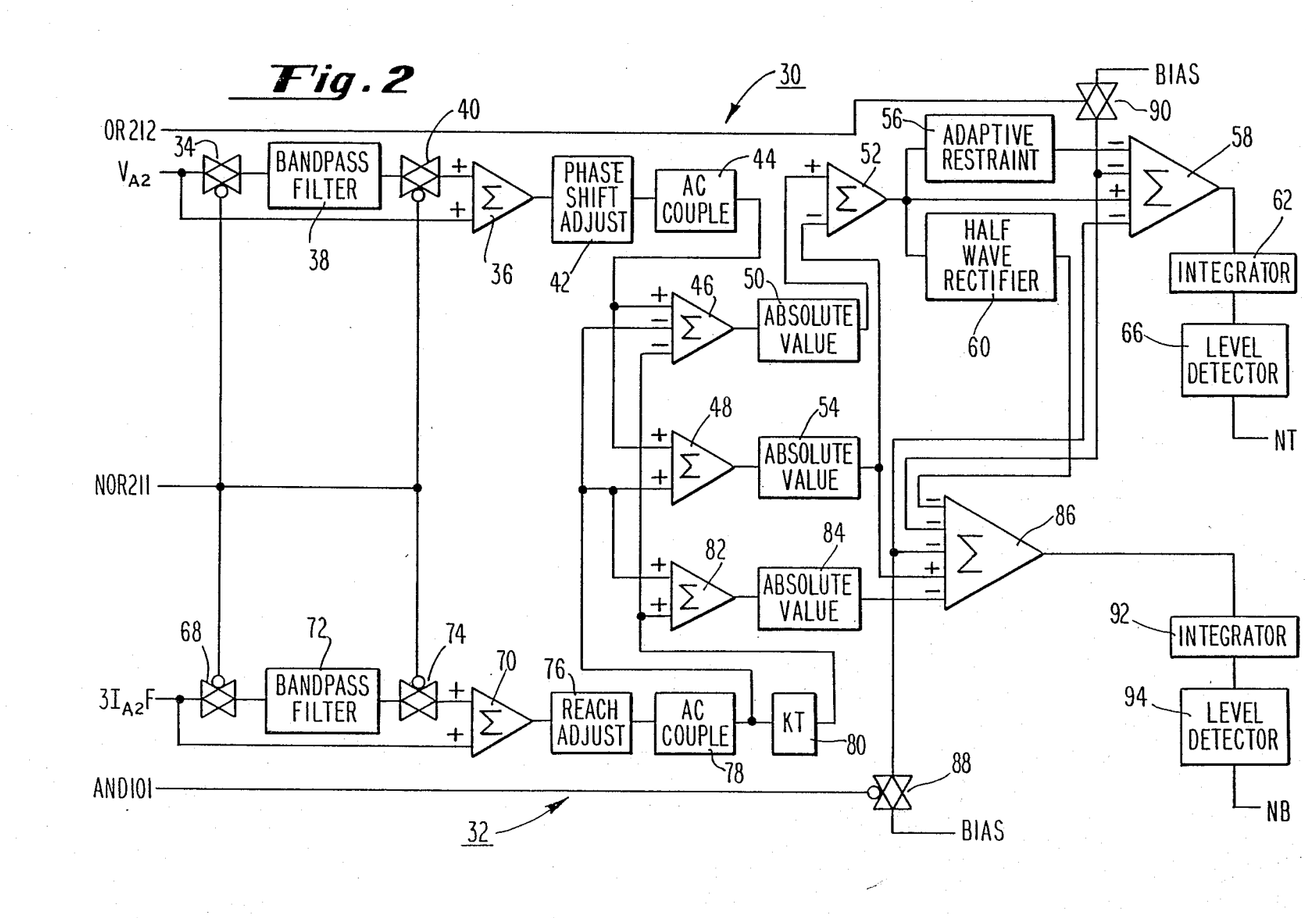
FIG. 2 is a block diagram of a preferred embodiment of a negative sequence directional trip unit and a negative sequence directional blocking unit in accordance with the present invention.

Referring now to FIG. 2, there is shown a negative sequence directional trip unit, generally designated 30, and a negative sequence directional blocking unit generally designated 32. The signal $V_{A2}$, which is generated as described with respect to FIG. 1, is coupled to a switch input of a first electronic switch 34 and one input of a first two input summing amplifier 36. In the preferred embodiment, the first electronic switch 34 is controlled by a signal applied to a control input. Application of a control signal to the control input will operate the switch thereby connecting the signal applied to in the input of the switch directly to its output. With respect to the first electronic switch 34, a "low" input signal applied to the control input will cause the signal at the switch input to be connected to the switch output. In the preferred embodiment, the first two input summing input amplifier 36 is an operational amplifier whose output is equal to the vector sum of the inputs.

The output of the first electronic switch 34 is coupled to the input of a third band pass filter 38. In the preferred embodiment, the third band pass filter 38 has a center frequency equal to the nominal power system frequency, typically 50 Hz or 60 Hz, a gain of −1 and a Q of approximately 3.8. The output of the third band pass filter 38 is coupled to the second input of the first two input summing amplifier 36 through a second electronic switch 40. The second electronic switch 40 is preferably the same type as the previously described first electronic switch 34. A control signal (NOR 211), which is generated to switch out the prefault $V_{A2}$ signal, for reasons which will be subsequently described, is coupled to the control input of the first electronic switch 34 and the control input of the second electronic switch 40.

The output of the first two input summing amplifier 36 is coupled to the input of a phase shift adjust network 42. In the preferred embodiment, the phase shift adjust circuit 42 comprises an adjustable angle "all pass filter". The output of the phase shift adjust circuit 42, which is substantially equal to the input signal shifted in phase by a predetermined amount preferably equal to the difference in impedance angle between the source and the line, is coupled to the input of a second AC couple circuit 44. In the preferred embodiment, the second AC couple circuit 44 is of the same type as the previously described first AC couple circuit 23, comprising a non-inverting operational amplifier which has a gain of one for input signals at the nominal power frequency, typically 50 Hz or 60 Hz, but a gain substantially equal to zero for any DC component in the input signal. The output of the second AC couple circuit 44 is connected to one input of a third three input summing amplifier 46. In the preferred embodiment, the third three input summing amplifier 46 is an operational amplifier whose output signal is equal to the vector sum of the inverting and non-inverting input signals.

The output of the first AC couple circuit 44 is also coupled to one input of a second two-input summing amplifier 48. In the preferred embodiment, the second two-input summing amplifier 48 is an operational amplifier whose output signal is equal to the vector sum of the input signals. The output of the third three-input summing amplifier 46 is coupled to the input of a first absolute value circuit 50. In the preferred embodiment, the first absolute value circuit 50 comprises a full wave precision rectifier of the type shown and described on pages 206 and 207 of the publication entitled "IC Op-AMP Cookbook", Second Edition, W. G. Jung, Howard Sams & Co., Inc. which is incorporated in this detailed description by reference as if fully set forth herein. The output of the first absolute value circuit 50, which is substantially equal to the absolute value of the input signal is coupled to a non-inverting input of a third two-input summing amplifier 52. In the preferred embodiment, the third two-input summing amplifier 52 is an operational amplifier whose output signal is equal to the vector sum of the inverting and non-inverting input signals.

The output of the second two-input summing amplifier 48 is coupled to the input of a second absolute value circuit 54. In the preferred embodiment, the second absolute value circuit 54 is of the same type as the previously described first absolute value circuit 50. The output of the second absolute value circuit 54, which is substantially equal to the absolute value of the input signal, is coupled to an inverting input of the third two-input summing amplifier 52. The output of the third two-input summing amplifier 52 is coupled to the input of a first adaptive restraint circuit 56, a non-inverting input of a four-input summing network 58 and the input of a half-wave rectifier circuit 60. In the preferred embodiment of the present invention, the adaptive restraint circuit 56 is an operational amplifier integrator circuit with a very long time constant. The output of the first adaptive restraint circuit 56, which is essentially a DC signal which in steady state is proportional to the input, is coupled to an inverting input of the four-input summing network 58. In the preferred embodiment, the four-input summing network 58 is an operational amplifier which generates an output signal having a magnitude which is equal to the algebraic sum of the magnitudes of the input signals applied to the non-inverting and inverting inputs.

Figure 3:
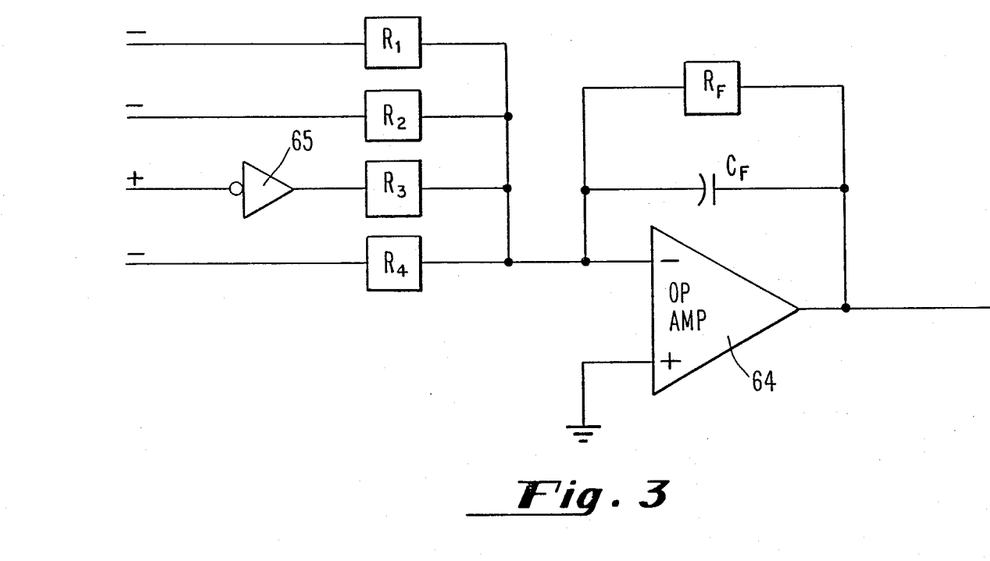
FIG. 3 is a block diagram of a preferred embodiment of an integrated summing amplifier and integrator for use in the present invention.

The output of the four-input summing network 58 is coupled to the input of a first integrator circuit 62. In the preferred embodiment, the first integrator circuit 62 and the four-input summing network 58 utilize a common operational amplifier 64 as shown in FIG. 3. As shown in FIG. 3, each of the three inverting inputs of the summing network is coupled to one terminal of an associated resistor, $R_1$, $R_2$, and $R_4$. The non-inverting input is coupled to one terminal of resistor $R_3$ through an inverter 65. The other terminals of resistors $R_1$ through $R_4$ are connected together and to an inverting input of the operational amplifier 64. The non-inverting input of the operational amplifier 64 is connected to ground. A feedback resistor $R_F$ is connected in parallel to a feedback capacitor $C_F$ with this parallel combination being connected between the output of the operational amplifier 64 and the inverting input.

Referring again to FIG. 2, the output of the first integrator 62 which, in the preferred embodiment is the output of the operational amplifier 64 (See FIG. 3), is coupled to the input of a first level detector 66. The output NT of the first level detector 66, is a signal which is generated when the magnitude of the input signal exceeds a predetermined level. In the preferred embodiment, this predetermined level is equal to 60 mv to provide a threshold to overcome extraneous signals.

The signal $3I_{42}F$, which is generated as described in accordance with FIG. 1, is coupled to the input of a third electronic switch 68 and one input of a fourth two-input summing amplifier 70. In the preferred embodiment, the third electronic switch 68 is the same type as the previously described first electronic switch 34 in that a "low" signal applied to the control input causes the signal $3I_{42}F$ applied to the switch input to be connected to the switch output. The fourth two-input summing amplifier 70 is preferably an operational amplifier whose output is equal to the vector sum of the inputs. The output of the third electronic switch 68 is coupled to the input of a fourth band-pass filter 72. The fourth band-pass filter 72 is preferably of the same type as the previously described first band-pass filter 38, having a center frequency equal to the nominal power system frequency, typically 50 Hz or 60 Hz, a gain of −1 and a Q approximately equal to 3.8.

The output of the fourth band-pass filter 72 is coupled to the other input of the fourth two-input summing amplifier 70 through a fourth electronic switch 74. In the preferred embodiment, the fourth electronic switch 74 is the same type as the previously described first electronic switch 34 in that a "low" signal applied to the control input will cause the signal at the switch input to be connected to the switch output. The NOR 211 signal is coupled to the control inputs of the third 68 and fourth 74 electronic switches. The output of the fourth two-input summing amplifier 70 is coupled to the input of a reach adjust circuit 76. In the preferred embodiment, the reach adjust circuit 76 is an operational amplifier with fixed gain corresponding to a reach of 20 ohms on a 5 amp rated relay. The output of the reach adjust circuit 76 which has been adjusted in magnitude to provide the proper replica impedance reach for the blocking zone protection, is coupled to the input of a third AC couple circuit 78. The third AC couple circuit 78 is preferably the said type as the previously described first AC couple circuit 23, having a gain of one for input signals at the nominal power system frequency, typically 50 Hz or 60 Hz, and a gain of substantially zero for any DC component in the input signal.

The output of the third AC couple circuit 78 is coupled to an inverting input of the third three-input summing amplifier 46, the second input of the second two-input summing amplifier 48, one input of a KT circuit 80 and one input of a fifth two-input summing amplifier 82. In the preferred embodiment, the KT circuit is a selectable input resistor to summing amplifiers 46 and 82. The output of the KT circuit 80, which has a gain equal to 0.0 to 1.0, is coupled to the second input of the fifth two-input summing amplifier 82 and a inverting input of the third three-input summing amplifier 46.

The fifth two-input summing amplifier 82 is preferably an operational amplifier whose output is equal to the vector sum of the inputs. The output of the fifth two-input summing amplifier 82 is coupled to the input of a third absolute value circuit 84. In the preferred embodiment, the third absolute value circuit 84 is of the same type as the previously described first absolute value circuit 50, having an output which is substantially equal to the absolute value of the input signal. The output of the third absolute value circuit 84 is coupled to an inverting input of a first five-input summing network 86. In the preferred embodiment, the first five-input summing network 86 is an operational amplifier which generates an output signal having a magnitude which is equal to the algebraic sum of the magnitudes of the input signals applied to the non-inverting and inverting inputs.

The output of the second absolute value circuit 54 is coupled to a non-inverting input of the first five-input summing network 86. The output of the half wave rectifier 60 is coupled to an inverting input of the first five-input summing network 86. A restraint bias signal is coupled to an inverting input of the first five-input summing network 86 and an inverting input of the four-input summing network 58 through a fifth electronic switch 88. In the preferred embodiment, the fifth electronic switch 88 is the same type as the previously described first electronic switch 34 in that a "low" signal applied to the control input will cause the signal applied to the switch input to be connected to the switch output.

A bias restraint signal is coupled to an inverting input of the four-input summing network 58 and an inverting input of the first five-input summing network 86 through a sixth electronic switch 90. In the preferred embodiment, the sixth electronic switch 90 is the same as the previously described first electronic switch 34 except that a "high" signal applied to the control input will cause the signal applied to the switch input to be connected to the switch output. A restraint control signal (AND 101), which is generated to switch out restraint in the negative sequence directional trip and blocking units, 30 and 32 respectively, for reasons which will be subsequently described, is coupled to the control input of the fifth electronic switch 88. A restraint control signal (OR212), which is generated to switch in restraint to the negative sequence directional trip and blocking units, 30 and 32 respectively for reasons which will be subsequently described, is coupled to the control input of the sixth electronic switch 90.

The output of the first five-input summing network 86 is coupled to a second integrator circuit 92. In the preferred embodiment, the second integrator circuit 92 and the five-input summing network 86 utilize a common operational amplifier in the same fashion as that described for the five-input summing network 58 and first integrator circuit 62 and shown in FIG. 3. The difference being that the five-input summing network 86 has four inverting inputs which are each coupled to one terminal of an associated resistor, $R_1$ through $R_4$, and a non-inverting input which is coupled to a fifth resistor $R_5$ through an inverter. The other terminals of resistors $R_1$ through $R_5$ are connected together and to the inverting input of the operational amplifier. The output of the integrator circuit 92 which, in the preferred embodiment, is the output of the operational amplifier, is coupled to the input of a second level detector 94. The output of the second level detector 94 is a signal NB, generated when the input exceeds a predetermined level which is, in the preferred embodiment one-half of the level used in the trip unit NT to ensure coordination on external faults.

The negative sequence directional overcurrent tripping and blocking unit of the present invention operate as follows. Under normal load conditions, the signals $V_{A2}$ and $3I_{42}F$ are essentially equal to zero because load currents and voltages are essentially positive sequence quantities. Signal AND 101 is low in the non-fault condition thus supplying a restraining bias to summing amplifiers 58 and 86. Consequently there is no output from level detectors 66 and 94.

On the occurrence of a fault in the blocking direction (away from the zone of protection), the signals $V_{A2}$ and $3I_{A2}F$ are approximately in phase. Thus, these two signals tend to subtract in summing amplifier 46 and add in summing amplifier 48. Therefore summing amplifier 52 produces a net restraining signal which prevents operation of NT while summing amplifier 86 tends to produce a net operating signal causing NB to produce an output. The fault currents cause the associated fault detector to operate and AND 101 produces a logic one ("high" signal) output removing restraint bias via switch 88.

On the occurrence of a fault in the tripping direction (toward the zone of protection), the signals $V_{A2}$ and $3I_{A2}F$ are approximately 180° out of phase. Thus these two signals tend to add in summing amplifier 46 and subtract in summing amplifier 48. Therefore summing amplifier 52 produces a net operating signal which causes NT to produce an output; while summing amplifier 86 tends to produce a net restraining signal which causes NB not to operate. When summing amplifier 52 produces a signal of the operate polarity, half wave rectifier 60 passes that signal to summing amplifier 86 as an additional restraint for improved coordination.

On the occurrence of an open pole following a single pole trip (in single pole tripping schemes), the associated logic causes NOR 211 to go to the logic zero state ("low" signal) which turns switches 34, 40, 68 and 74 to the ON condition. This inserts band pass filters 38 and 72 in service. Therefore, the output of summing amplifier 36 becomes $\Delta V_{A2}$ and is essentially zero during the time of the open pole, even though $V_{A2}$ has a value during an open pole condition. Similarly, the output of summing amplifier 70 becomes $\Delta I_2$ and is essentially zero during the open pole. Thus, on the occurrence of a fault during the open pole condition, the signals $\Delta V_{A2}$ and $\Delta I_2$ will respond only to the fault quantities and will not be influenced by the unbalance caused by the open pole. This allows the negative sequence directional units to remain in service and to function correctly during an open pole condition.

Figure 4:
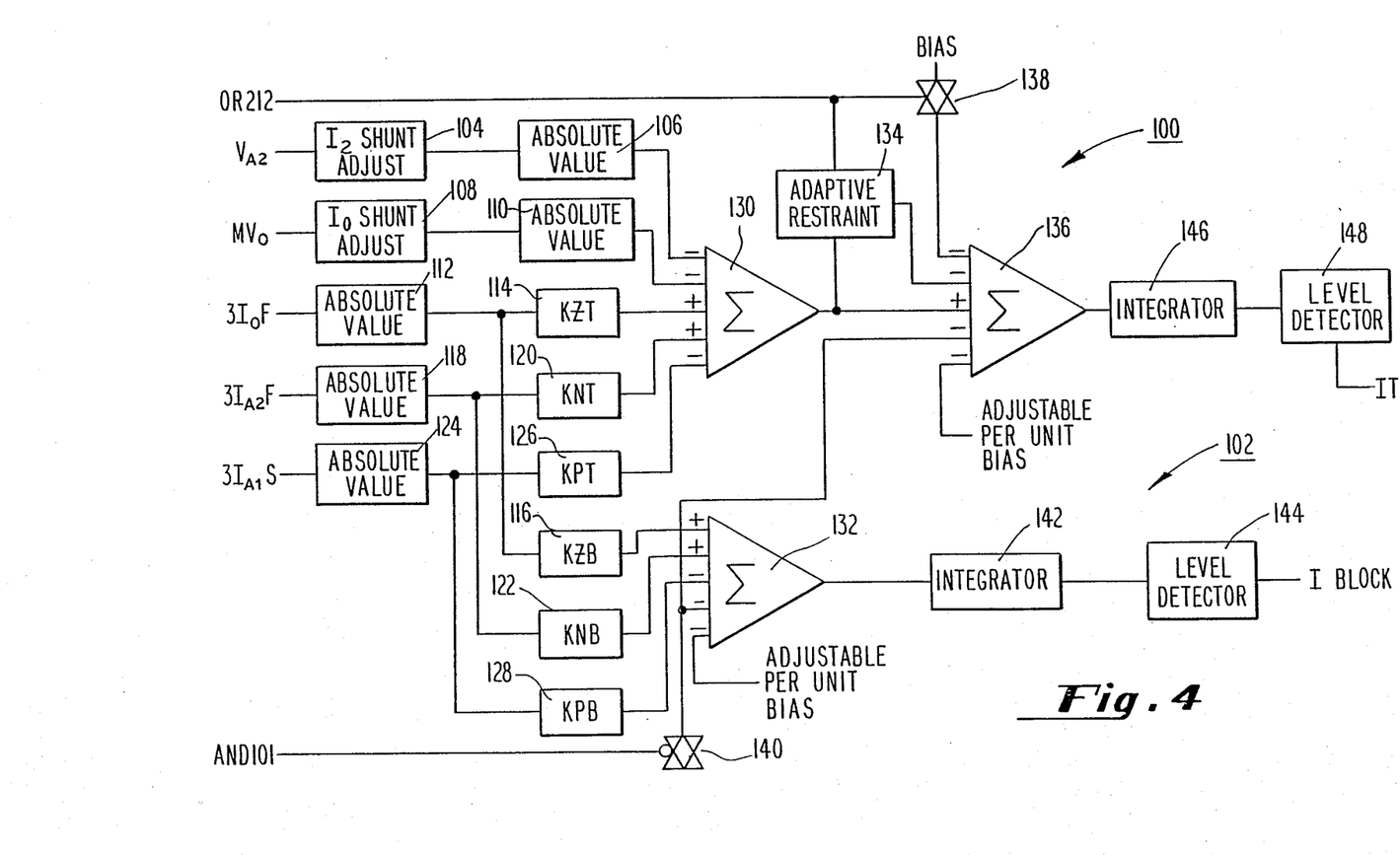
FIG. 4 is a block diagram of a preferred embodiment of a negative and zero sequence overcurrent trip unit and a negative and zero sequence overcurrent blocking unit in accordance with the present invention.

Referring now to FIG. 4 there is shown a block diagram of a preferred embodiment of a sequence overcurrent trip unit generally designated 100 and a sequence overcurrent blocking unit generally designated 102. The $V_{A2}$ signal, which is generated as previously described with respect to FIG. 1, is coupled to the input of an $I_2$ shunt adjust circuit 104. In the preferred embodiment, the $I_2$ shunt adjust circuit 104 is adjusted to provide a restraining output signal proportional to the negative sequence charging current in the transmission line. The output of the $I_2$ shunt adjust circuit 104 is coupled to the input of a fourth absolute value circuit 106. In the preferred embodiment, the fourth absolute value circuit 106 is of the same type as the previously described first absolute value circuit 50, having an output which is substantially equal to the absolute value of the input signal.

The signal $MV_0$, which is generated as previously described with respect to FIG. 1, is coupled to the input of a $I_0$ shunt adjust circuit 108. In the preferred embodiment, the $I_0$ shunt adjust circuit 108 is adjusted to provide a restraining output signal proportional to the zero sequence charging current in the transmission line. The output of the $I_0$ shunt adjust circuit 108 is coupled to the input of a fifth absolute value circuit 110. In the preferred embodiment, the fifth absolute value circuit 110 is of the same type as the previously described first absolute value circuit 50, having an output which is substantially equal to the absolute value of the input signal.

The signal $3I_0F$, which is generated as previously described with respect to FIG. 1, is coupled to the input of a sixth absolute value circuit 112. In the preferred embodiment, the sixth absolute value circuit 112 is the same type as the previously described first absolute value circuit 50, having an output which is substantially equal to the absolute value of the input signal. The output of the sixth absolute value circuit 112 is coupled to the input of a KZT circuit 114 and the input of a KZB circuit 116. The signal $3I_{A2}F$, which is generated as previously described with respect to FIG. 1, is coupled to the input of a seventh absolute value circuit 118. In the preferred embodiment, the seventh absolute value circuit 118 is of the same type as the previously described first absolute value circuit 50, having an output which is substantially equal to the absolute value of the input signal. The output of the seventh absolute value circuit 118 is coupled to the input of a KNT circuit 120 and the input of a KNB circuit 122.

The signal $3I_{A1}S$, which is generated as previously described with respect to FIG. 1, is coupled to the input of an eighth absolute value circuit 124. In the preferred embodiment, the eighth absolute value circuit 124 is of the same type as the previously described first absolute value circuit 50 having an output which is substantially equal to the absolute value of the input signal. The output of the eighth absolute value circuit 124 is coupled to the input of a KPT circuit 126 and the input of KPB circuit 128.

The outputs of the fourth absolute value circuit 106 and the fifth absolute value circuit 110 are each connected to an inverting input of a second five-input summing amplifier 130. In the preferred embodiment, the second five-input summing amplifier 130 is of the same type as the previously described first five-input summing amplifier 86. The KZT circuit 114, KNT circuit 120 and KPT circuit 126 each preferably comprise a selectable input resistor to inputs of the second five-input summing amplifier 130. The KZT selectable resistor 114 is coupled to a non-inverting input, the KNT selectable input resistor 120 is coupled to a non-inverting input, and the KPT selectable input resistor is coupled to a inverting input of the second five-input summing amplifier 130.

The KZB 116, KNB 122 and KPB 128 circuits each preferably comprise a selectable input resistor to a third five-input summing amplifier 132, with the KZB resistor 116 and KNB resistor 122 being coupled to a non-inverting inputs, and the KPB resistor 128 being coupled to an inverting input of the third five input summing amplifier 132.

The output of the second five-input summing amplifier 130 is coupled to the input of a second adaptive restraint circuit 134 and a non-inverting input of a fourth five-input summing amplifier 136. In the preferred embodiment of the present invention, the second adaptive restraint circuit 134 is an operational amplifier integrator circuit with a very long time constant. The output of the second adaptive restraint circuit 134, which is essentially a DC signal which, in steady state, is proportional to the input, is coupled to an inverting input of the fourth five-input summing amplifier 136.

The restraint control signal (OR212), which has been previously described, is coupled to a control input of the second adaptive restraint network 134 and the control input of a seventh electronic switch 138. A "high" signal applied to the control input of the second adaptive restraint network 134, removes a limit on the adaptive restraint output. The limit has a magnitude which prevents operation on maximum value of zero and negative sequence currents expected under non-fault conditions. There will be a steady state output for fault currents which exceed a predetermined magnitude. The seventh electronic switch 138 is of the same type as the previously described sixth electronic switch 90 in that a "high" signal applied to the control input will cause the signal applied to the switch input to be connected to the switch output. A bias signal is connected to an inverting input of the fourth five-input summing amplifier 136 through the seventh electronic switch 138.

A bias signal is coupled to an inverting input of the third five-input summing amplifier 132 and an inverting input of the fourth five-input summing amplifier 136 through an eighth electronic switch 140. In the preferred embodiment, the eighth electronic switch 140 is the same as the previously described first electronic switch 34 in that a "low" signal applied to the control input will cause the signal applied to the switch input to be connected to the switch output. The restraint control signal AND 101, which was previously described, is connected to the control input of the eighth electronic switch 140. An adjustable per unit bias signal is coupled to an inverting input of the third five-input summing amplifier 132. A second adjustable per unit bias signal is coupled to an inverting input of the fourth five-input summing amplifier 136.

The output of the third five-input summing amplifier 132 is coupled to the input of a third integrator circuit 142. In the preferred embodiment, the third integrator circuit 142 and the third five input summing network 132 utilize a common operational amplifier in the same fashion as that described for the first five-input summing amplifier 58 and the first integrator circuit 62 and shown in FIG. 3. The difference being that the third five-input summing amplifier 132 has two non-inverting inputs which are each coupled to one terminal of the selectable resistors KZB 116 and KNB 122, and an inverting input which is coupled to one terminal of the KPB selectable resistor 128. The output of the third integrator circuit 142 which, in the preferred embodiment, is the output of the operational amplifier, is coupled to the input of a third level detector 144. In the preferred embodiment, the third level detector 144 is of the same type as the previously described first level detector 66. The output IBLOCK of the third level detector 144 is a signal which is generated when the magnitude of the input signal exceeds a predetermined level. In the preferred embodiment, this predetermined level is equal to 60 mv to provide a threshold to overcome extraneous signals.

The output of the fourth five-input summing amplifier 136 is coupled to the input of a fourth integrator circuit 146. In the preferred embodiment, the fourth integrator circuit 146 is an operational amplifier configured as an integrator having a parallel RC feedback path a shown with respect to the operational amplifier 64 in FIG. 3. The output of the fourth integrator 146, which is a signal whose magnitude is the integral of the magnitude of the output signal from the fifth five-input summing amplifier 136, is coupled to the input of a fourth level detector 148. In the preferred embodiment, the fourth level detector 148 is of the same type as the previously described first level detector 66. The output IT of the fourth level detector 148 is a signal which is generated when the magnitude of the input signal exceeds a predetermined level. In the preferred embodiment, this predetermined level is equal to 60 mv to provide a threshold to overcome extraneous signals.

The negative and zero sequence overcurrent tripping and blocking components of the present invention operate as follows. Under normal load conditions the magnitude of the signals $V_{A2}$, $MV_0$, $3I_0F$, and $3I_{A2}F$ are very small in view of the need to minimize losses on the transmission line. Nevertheless, the IT and I BLOCK are extremely sensitive units in order to detect very high resistance ground faults on the transmission line. Thus, under very heavy load conditions, the magnitude of $3I_0F$ and $3I_{A2}F$ could approach or exceed the pickup level of the IT and/or I BLOCK units. However, the restraint produced by $3I_{A1}S$ prevents operation of the IT and I BLOCK units. The signal AND 101 is low, providing a restraint signal level in the integrators 146 and 142 in the case of light or zero load flow. OR 212 produces a high signal during the open pole period in a single pole tripping application. NOR 211 provides a low signal during the open pole period.

Under unusual load conditions, such as an open pole in an adjacent line, $3I_0F$ and $3I_{A2}F$ may be sufficiently large to exceed the restraint produced by $3I_{A1}S$. In this case steady state operation of IT will be blocked by the adaptive restraint circuit.

Under a single line to ground fault, a fault detector operates, causing AND 101 to go high. Assuming $3I_0F$, $3I_{A2}F$ and $3I_{A1}S$ are approximately equal, the weighting factors KZB, KNB, KPB, KZT, KNT and KPT are such that the operate signal due to $3I_0F$ and $3I_{A2}F$ is approximately 10 times the restraint produced by $3I_{A1}S$ in the IT unit and 15 times in the I BLOCK unit. $MV_0$ and $V_{A2}$ magnitudes will depend on the fault location and the magnitude of the fault resistance. In general, the restraint due to $MV_0$ and $V_{A2}$ will be very small compared to the operate signal due to $3I_{A2}F$ and $3I_0F$, except where the source impedance is extremely large.

The use of an integrator and level detector combination for negative sequence directional overcurrent units in accordance with the present invention, has a number of advantages over prior art phase angle comparator-type units. These advantages include, for example, the RC time constant of the parallel resistor-capacitor circuit used in the integrator as shown in FIG. 3, provides filtering of the signals and establishes the operating time of the unit. The smoothing effects of the integrator cause the fault incidence angle and the phase angle between the operate and restraint signals to have only a secondary effect on the operating time.

Another advantage is the facility with which the directional units can be modified to enhance the overall performance of the relay scheme. For example, use of the operating energy in the negative sequence directional tripping unit to restrain the negative sequence directional blocking unit permits the blocking unit to employ a hybrid design, that is a combined directional-/overvoltage unit, that provides very reliable operation on external faults, thereby enhancing the coordination between the local blocking and the local tripping directional units.

Increased security is achieved by adding a zero sequence operate quantity to the negative sequence operate quantity which results in the negative sequence component of the current I₂ having less of an effect. Advantage is taken of the fact that the zero sequence current is typically much smaller than the positive and negative sequence currents for external faults. Given the same system, the negative and zero sequence directional overcurrent trip unit of the present invention will operate for fewer external faults than will prior art units. Further, the zero sequence current due to load current flowing through dissymmetries in the power system, (such as untransposed lines, or lines with an open pole), is usually very much smaller than the negative sequence current.

As previously indicated, the integrator/level detector combination of the present invention also adds to the security of the system, as compared to prior art schemes, due to comparatively longer operating times on remote external faults. This increases the probability that the external fault will be cleared before the tripping unit can operate thus diminishing the possibility of misoperation where a false channel operation might occur during the fault.

The negative and zero sequence directional overcurrent unit of the present invention also provides increased sensitivity to high resistance ground faults by utilizing adaptive restraint in the overcurrent tripping unit 100. The adaptive restraint signal used in the tripping unit of the present invention is proportional to the negative sequence voltage. Therefore, as the negative sequence voltage increases, the tripping unit restraint is increased whereas for little or no negative sequence voltage, the tripping unit is close to or at its most sensitive pickup value. This adaptive restraint for the shunt charging current results in the unit having a greater sensitivity to high resistance ground faults as compared to prior art units.

As can be seen from the above-detailed description, the negative and zero sequence directional overcurrent units of the present invention provides increased security by reducing the number of external faults that are detected. The present invention also eliminates the need for a setting on the overcurrent blocking unit and provide increased sensitivity to higher resistance ground faults.

A primary advantage of the negative and zero sequence directional overcurrent unit of this invention is that it can function correctly with one pole open on the transmission line. The prior art relay did not operate correctly and was removed from service during the open pole period.

The present invention has been described with reference to a specific embodiment thereof, it will be obvious to those skilled in the art that various changes and modifications ma be mad without departing from the invention in its broader aspects. It is contemplated in the appended claims to cover all variations and modifications of the invention that come within the true spirit and scope of our invention.

What is claimed is:

1. A directional overcurrent relay for detecting faults on a transmission line in a three phase alternating current electrical power distribution system, said relay comprising:
    (a) means for generating a first operate signal which is related to a zero sequence component of current flowing in said power distribution system;
    (b) means for generating a second operate signal which is related to a negative sequence component of current flowing in said power distribution system;
    (c) means for generating a restraint signal which is related to a positive sequence component of current flowing in said power distribution system;
    (d) means for summing said operate signals; and
    (e) means for comparing the magnitude of the summed operate signals with the magnitude of said restraint signal and generating a net operate signal when the magnitude of the summed operate signals exceeds the magnitude of the restraint signal.

2. A directional overcurrent relay in accordance with claim 1 additionally comprising:
    (a) means for generating a first adaptive restraint signal comprising the sum of the magnitudes of a signal which is related to a negative sequence component of a power distribution system voltage and a signal which is related to a zero sequence component of said power distribution system voltage;
    (b) means for summing said restraint and first adaptive restraint signals; and
    (c) means for comparing the magnitude of the summed operate signals with the magnitude of the summed restraint and first adaptive restraint signals and generating said net operate signal when the magnitude of the summed operate signals exceeds the magnitude of the summed restraint and first adaptive restraint signals.

3. The protective relay in accordance with claim 2, additionally comprising at least one energy comparison means adapted to receive said net operate signal, said energy comparison means comprising:
    (a) integrator circuit means comprising an operational amplifier having an input adapted to receive said net operate signal, an output, and a feedback circuit connected between said input and said output, said feedback circuit comprising resistance means and capacitance means electrically connected in parallel; and
    (b) level detector means for generating a relay output signal when the magnitude of an output signal from the output of said operational amplifier exceeds a predetermined level.

4. A directional overcurrent relay in accordance with claim 3 comprising a first energy comparison means adapted to receive said net operate signal, said first energy comparison means comprising:
    (a) integrator circuit means comprising an operational amplifier having an input adapted to receive said net operate signal, an output, and a feedback circuit connect between said input and said output, said feedback circuit comprising resistance means and capacitance means electrically connected in parallel; and
    (b) level detector means for generating an overcurrent trip output signal when the magnitude of an output signal from the output of said operational amplifier exceeds a predetermined level.

5. A directional overcurrent relay in accordance with claim 4 additionally comprising:
    (a) means for generating a second adaptive restraint signal which comprises said net operate signal multiplied by a signal whose magnitude increases from approximately zero to approximately one in accordance with a predetermined time constant;
    (b) means for selectively limiting the magnitude of said second adaptive restraint signal; and (b) means for comparing the magnitude of said net operate signal and the magnitude of said second adaptive restraint signal in said energy comparison means whereby the magnitude of the output signal from the output of said operational amplifier is related to the magnitude of the difference therebetween.

6. A directional overcurrent relay in accordance with claim 5 additionally comprising second energy comparison means adapted to receive said first and second operate signals and said restraint signal, said second energy comparison means comprising:
 (a) means for summing said first and second operate signals;
 (b) means for comparing the magnitude of said summed operate signals with the magnitude of said restraint signal and providing a first net signal having a magnitude which is related to the difference between the magnitude of said summed operate signals and the magnitude of said restraint signal;
 (c) second integrator circuit means comprising a second operational amplifier having an input adapted to receive said first net signal, an output, and a feedback circuit connected between said input and said output, said feedback circuit comprising resistance means and capacitance means electrically connected in parallel; and
 (d) level detector means for generating an overcurrent block signal when the magnitude of the output signal from the output of said operational amplifier exceeds a predetermined level.

7. A directional overcurrent relay in accordance with claim 6 additionally comprising:
 (a) means for generating a third operate signal having a magnitude which is related to the difference between a signal $V_2$ related to a negative sequence component of a power distribution system voltage and the sum of the magnitudes of signal $I_2$ related to a negative sequence component of a current flowing in said power distribution system plus said $I_2$ signal multiplied by a predetermined scaling factor KT;
 (b) means for generating a second restraint signal which is related to the sum of the magnitudes of said $V_2$ signal and said $I_2$ signal;
 (c) means for comparing the magnitude of the third operate signal with the magnitude of the second restraint signal and generating a second net operate signal when the magnitude of the third operate signal exceeds the magnitude of the second restraint signal;
 (d) third energy comparison means adapted to receive said second net operate signal, said third energy comparison means comprising:
  (i) third integrator circuit means comprising a third operational amplifier having an input adapted to receive said second net operate signal, an output, and a feedback circuit connected between said input and said output, said feedback circuit comprising resistance means and capacitance means electrically connected in parallel; and
  (ii) level detector means for generating a directional trip signal when the magnitude of an output signal from the output of said operational amplifier exceeds a predetermined level.

8. A directional overcurrent relay in accordance with claim 7 additionally comprising:
 (a) means for generating a third restraint signal having a magnitude which is related to the sum of the magnitudes of said $I_2$ and said $KTI_2$ signals; and
 (b) fourth energy comparison means adapted to receive said second and third restraint signals, said fourth energy comparison means comprising;
  (i) means for comparing the magnitude of the second restraint signal with the magnitude of the third restraint signal and providing a third net signal having an output which is related to the difference between the magnitudes of said second restraint signal and said third restraint signal;
  (ii) fourth integrator circuit means comprising a fourth operational amplifier having an input adapted to receive said second net signal, an output, and a feedback circuit connected between said input and said output, said feedback circuit comprising resistance means and capacitance means electrically connected in parallel; and
  (iii) level detector means for generating a directional blocking signal when the magnitude of the output signal from the output of said operational amplifier exceeds a predetermined level.

9. A directional overcurrent relay in accordance with claim 8 additionally comprising:
 (a) means for coupling at least a potion of said second net operate signal to said fourth energy comparison means;
 (b) means for summing said at lest a portion of said second net operating signal with said third restraint signal;
 (c) means for comparing the magnitude of said summer third restraint signal and said at least a portion of said second net operate signal with said second restraint signal and providing a third net signal having an output which is related to the difference between the magnitude of said summed third restraint signal and said at least a portion of said second net operate signal, and the magnitude of said second restraint signal; and
 (d) means for coupling said third net signal to the input of said fourth operational amplifier.

10. A directional overcurrent relay in accordance with claim 9 additionally comprising:
 (a) means for generating a signal $V_2$, upon occurrence of an open pole following a single pole trip of another phase of said three phase alternating current electric power distribution system, which signal is related to a fault quantity of the signal $V_2$; and
 (b) means for generating a signal $I_2$, upon occurrence of said open pole, which signal is related to a fault quantity of the signal $I_2$;
whereby said third operate signal has a magnitude which is related to difference between said $V_2$ signal and said $I_2$ signal; said second restraint signal is related to t he sum of the magnitudes of said $V_2$ and $I_2$ signals; and said third restraint signal has a magnitude which is related to the sum of the magnitudes of said $I_2$ signal and said $I_2$ signal multiplied by said KT scaling function, during the occurrence of said open pole.

* * * * *

UNITED STATES PATENT AND TRADEMARK OFFICE
CERTIFICATE OF CORRECTION

PATENT NO. : 4,825,327

DATED : April 25, 1989

INVENTOR(S) : Alexander et al

It is certified that error appears in the above-identified patent and that said Letters Patent is hereby corrected as shown below:

Column 7, line 43, delete the word "said" and replace with the word --same--.

Column 11, line 51, delete "!44" and replace with the number --144--.

Column 12, line 4, delete "!48" and replace with the number --148--.

Column 13, line 54, delete the word "ma" and replace with the word --may--; delete the word "mad" and replace with the word --made--.

Column 16, line 50, add the symbol --$\triangle$-- between the word "signal" and "$V_2$".

Column 16, line 55, add the symbol --$\triangle$-- between the word "signal" and "$I_2$".

Column 16, line 59, add the symbol --$\triangle$-- between the word "said" and "$V_2$".

Column 16, line 60, add the symbol --$\triangle$-- between the word "said" and "$I_2$".

Column 16, line 61, add the symbol --$\triangle$-- between the word "said" and "$V_2$"; and between "and" and "$I_2$".

Column 16, line 63, add the symbol --$\triangle$-- between the word "said" and "$I_2$".

UNITED STATES PATENT AND TRADEMARK OFFICE
CERTIFICATE OF CORRECTION

PATENT NO. : 4,825,327

DATED : April 25, 1989

INVENTOR(S) : Alexander et al.

It is certified that error appears in the above-identified patent and that said Letters Patent is hereby corrected as shown below:

Column 16, line 64, add the symbol -- $\triangle$ -- between the word "said" and "$I_2$".

Signed and Sealed this

Twentieth Day of March, 1990

Attest:

JEFFREY M. SAMUELS

Attesting Officer

Acting Commissioner of Patents and Trademarks